United States Patent [19]

Tsaur

[11] Patent Number: 5,073,591

[45] Date of Patent: Dec. 17, 1991

[54] POLYMERIC THICKENERS AND METHODS OF PRODUCING THE SAME

[75] Inventor: Sheng-Liang Tsaur, Racine, Wis.

[73] Assignee: S. C. Johnson & Son, Inc., Racine, Wis.

[21] Appl. No.: 583,411

[22] Filed: Sep. 17, 1990

Related U.S. Application Data

[62] Division of Ser. No. 384,360, Jul. 21, 1989.

[51] Int. Cl.$^5$ .............................................. C08L 9/06
[52] U.S. Cl. ................................ 524/460; 526/318.4; 526/932
[58] Field of Search ..................... 524/460; 526/318.4, 526/932

[56]  References Cited

U.S. PATENT DOCUMENTS 4,064,087  12/1977  Das ...................................... 524/460

Primary Examiner—Joseph L. Schofer
Assistant Examiner—Jeffrey T. Smith

[57]  ABSTRACT

A method for producing an acidic, concentrated, polymeric emulsion that can be diluted and thereafter neutralized to provide a novel polymeric thickener is disclosed. The method comprises emulsion-polymerizing, in acidic aqueous media, a first monomer mixture which comprises an acidic moiety-containing monomer and an ethylenically-unsaturated monomer copolymerizable with the acidic moiety-containing monomer, for producing an alkali-soluble dispersion in the acidic aqueous media. The ethylenically-unsaturated monomer is selected from the group consisting of a mono vinylidene aromatic monomer, an alpha beta ethylenically-unsaturated carboxylic acid ester and its derivatives, a vinyl ester and its derivatives, an ethylenically-unsaturated dicarboxylic anhydride and its derivatives, and mixtures thereof. The method further comprises adding to the alkali-soluble dispersion-containing aqueous media a second monomer mixture which comprises the above-mentioned ethylenically-unsaturated monomer and an amino moiety-containing monomer that is copolymerizable with the ethylenically-unsaturated monomer, and then emulsion-polymerizing the second monomer mixture in the presence of the alkali-soluble dispersion, while maintaining acidic conditions of the aqueous media, for producing the concentrated, polymeric emulsion mentioned above. The concentrated, polymeric emulsion can readily be diluted. Upon being diluted, the thus-diluted polymeric emulsion, upon adjustment of pH to more than about 6.5, provides the novel polymeric thickener mentioned above.

1 Claim, 1 Drawing Sheet

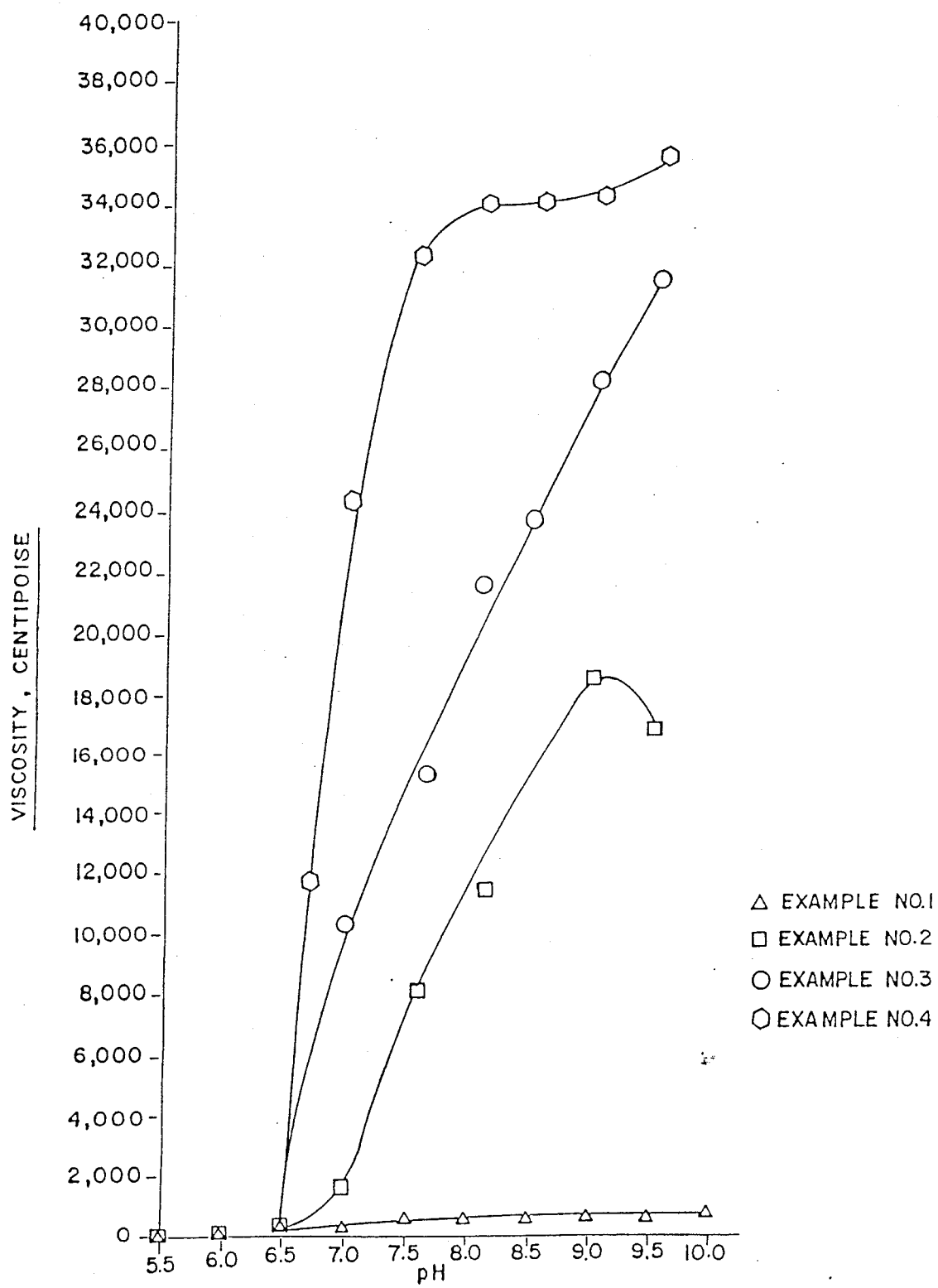

POLYMERIC THICKENERS AND METHODS OF PRODUCING THE SAME

This new application is a division of U.S. application Ser. No. 07/384,360 which was filed on July 21, 1989, the benefit of which is now claimed for purposes of priority pursuant to 35 U.S.C. § 120.

TECHNICAL FIELD OF THE INVENTION

One aspect of my present invention is generally directed to the subject of polymeric thickeners. Such polymeric thickeners are typically utilized in aqueous systems.

Another aspect of my present invention, accordingly, is generally directed to a method of producing such polymeric thickeners.

BACKGROUND OF THE INVENTION

Many aqueous systems utilize thickeners to provide a particular formulation with a desired viscosity. For example, certain aqueous thickeners are utilized in the formulation of a number of drilling muds. Other aqueous thickeners are utilized in the formulation of a number of polishing and cleaning compositions. Still other aqueous thickeners are utilized in the manufacture and/or preparation of a number of personal-care and food-product formulations as well as certain pharmaceuticals. While other aqueous thickeners are utilized in the formulation of a number of coating compositions such as latex paints.

In recent years, latex paints, i.e. paints based on aqueous emulsions or so-called "dispersions" of synthetic organic polymers, have come into widespread use because they can easily be applied to a substrate, because they are easily cleaned from brushes and rollers, and because they are generally free of objectionable odor.

Thickeners are commonly used in latex paint formulations, as well as in a variety of other coating compositions, to provide desired thickening properties. There are many types of thickeners now used in paints and other coating compositions.

Water-soluble materials employed as thickeners include natural gums and resins, such as starch, gum arabic, certain modified-starch products, dextrins, sodium alginates, gums (such as tragacanths) and other such compounds. Synthetic materials employed as thickeners include polyvinyl alcohol, polyacrylamide, polyacrylic acid and certain salts thereof, methyl cellulose and other cellulose derivatives such as carboxymethyl cellulose and hydroxyethyl cellulose, polyvinyl pyrrolidone, polyvinyl methylether, polyethylene oxides and copolymers of polyvinyl methylether and maleic anhydride.

However, water-soluble polymers derived from cellulose and other natural products are becoming increasingly expensive to produce because of high capital, energy, and waste-disposal costs.

The current trend, therefore, is to utilize specially-prepared polymeric thickeners in the manufacture of a number of formulations so as to provide such formulations with certain desired viscosity properties at relatively low cost.

An effective thickener should be used in minimum amount, however, and should not affect the basic properties of the aqueous system in which it is used.

Accordingly, disclosed herein is a novel polymeric thickener as well as a novel method for its manufacture.

SUMMARY OF THE INVENTION

A novel method for producing a novel, concentrated, polymeric emulsion will now be summarized. The concentrated, polymeric emulsion, initially acidic, can be diluted and thereafter neutralized to thereby provide my novel polymeric thickener.

The method for producing the concentrated, polymeric emulsion, more particularly, comprises the step of emulsion-polymerizing, in acidic aqueous media, a first monomer mixture which comprises an acidic moiety-containing emulsion-polymerizable monomer and an effective amount of an ethylenically-unsaturated emulsion-polymerizable monomer, at predetermined reaction conditions, for producing an alkali-soluble dispersion in the aqueous media. The ethylenically-unsaturated monomer is selected from the group consisting of a mono vinylidene aromatic monomer, an alpha beta ethylenically-unsaturated carboxylic acid ester and its derivatives, a vinyl ester and its derivatives, an ethylenically-unsaturated dicarboxylic anhydride and its derivatives, and mixtures thereof. The acidic moiety-containing monomer is preferably selected from the group consisting of acrylic acid, methacrylic acid, an acid phosphate moiety-containing emulsion-polymerizable monomer, a sulphonic acid moiety-containing emulsion-polymerizable monomer, and mixtures thereof.

Still more particularly, my novel method for producing the concentrated, polymeric emulsion further comprises the steps of (1) adding to the alkali-soluble dispersion-containing aqueous media a second monomer mixture which comprises the ethylenically-unsaturated monomer (of the type mentioned above) and an effective amount of an amino moiety-containing emulsion-polymerizable monomer and (2) emulsion-polymerizing the second monomer mixture in the presence of the alkali-soluble dispersion, while maintaining acidic conditions of the aqueous media, for producing my novel, concentrated, polymeric emulsion. The thus-produced concentrated polymeric emulsion, initially acidic, can then be diluted and thereafter neutralized to provide my novel polymeric thickener.

BRIEF DESCRIPTION OF THE DRAWING

The accompanying drawing FIGURE is a graph which presents viscosity, in centipoise, of four (4) separate polymeric emulsions at various pH values. Each such emulsion, initially prepared at a concentration of about 30 weight-percent (wt.-%) solids, was subsequently diluted to 2 wt.-% solids. Each such viscosity value was determined utilizing a Brookfield viscometer at a six (6) revolutions-per-minute (rpm) spindle speed.

DETAILED DESCRIPTION OF PREFERRED EMBODIMENTS

While my present invention is susceptible to embodiment in various forms, there is shown in the accompanying drawing FIGURE and hereinafter described in detail several presently-preferred embodiments of my present invention, with the understanding that the present disclosure is to be considered as merely an exemplification of my invention without limitation to the specific embodiments discussed and/or depicted herein.

As mentioned above, one aspect of my present invention is directed to a method for producing an acidic, concentrated polymeric emulsion that can be diluted and thereafter neutralized to provide a polymeric thickener. Accordingly, one preferred method of producing the novel, concentrated, polymeric emulsion of my present invention comprises the steps of:

emulsion polymerizing, in acidic aqueous media, a first monomer mixture which, based upon total weight of the first monomer mixture, comprises:

about 30-60 wt.-% of an acidic moiety-containing emulsion-polymerizable monomer, about 40-70 wt.-% of an ethylenically-unsaturated emulsion-polymerizable monomer selected from the group consisting of a mono vinylidene aromatic monomer, an alpha beta ethylenically-unsaturated carboxylic acid ester and its derivatives, a vinyl ester and its derivatives, an ethylenically-unsaturated dicarboxylic anhydride and its derivatives, and mixtures thereof, and about 0-2 wt.-% of a crosslinker, at a predetermined emulsion-polymerization reaction temperature and for a predetermined period of time, for producing an alkali-soluble dispersion in the aqueous media;

adding to the alkali-soluble dispersion-containing aqueous media a second monomer mixture which, based upon total weight of the second monomer mixture, comprises:

about 50-95 wt.-% of the above-mentioned ethylenically-unsaturated monomer, about 5-50 wt.-% of an amino moiety-containing emulsion-polymerizable monomer that is copolymerizable with the ethylenically-unsaturated monomer, about 0-4 wt.-% of a chain-transfer agent, and about 0-2 wt.-% of the above-mentioned crosslinker; and emulsion-polymerizing the second monomer mixture in the presence of the alkali-soluble dispersion at a predetermined emulsion-polymerization reaction temperature and for a predetermined period of time, while maintaining acidic conditions of the aqueous media, for producing the concentrated, polymeric emulsion mentioned above.

The polymeric emulsion, thus produced, is typically about 30 wt.-% solids on a total weight-of-solids basis.

Emulsion polymerization is effected in the presence of a so-called "catalyst" or initiator, preferably one which serves as a thermally-activated source of free radicals. Among such initiators which may be mentioned are peracetic acid, hydrogen peroxide, various persulfates, various perphosphates, various perborates, various percarbonates, and various azo compounds.

Suitable azo-type free-radical initiators, for purposes of this disclosure, include azodiisobutyl nitrile, azobisdimethyl valeronitrile, azobisisobutyl nitrile, azodiisobutyl amide, azobis(alpha-ethylbutyl nitrile) and azobis(alpha,gamma-dimethylcapronitrile).

Among the water-soluble initiators which may be used are hydrogen peroxide, hydroperoxides such as tertiary-butyl hydroperoxide, and sodium, potassium, ammonium and barium persulfate as well as acetyl peroxide.

Preferred initiators include certain inorganic compounds such as ammonium persulfate (APS) and potassium persulfate.

The amount of initiator used is normally about 0.03 to 3.0 wt.-% based on the total weight of all of the monomers, and preferably about 0.25 to 0.6 wt.-%.

Also, preferably, the initiator is a so-called "redox combination" which may consist of a water-soluble persulfate as the "oxidizing" component of the redox combination, and a hydrosulfite, e.g. sodium hydrosulfite, as the "reducing" component of the redox combination. Water-soluble bisulfites, metabisulfites and/or thiosulfates, and formaldehyde sulfoxilate may be used in lieu of the hydrosulfites. Other typical redox combinations, such as (1) sodium azide and ceric ammonium sulfate and (2) titanium trichloride and hydroxylamine, may also be used. Generally useful proportions of the above-indicated persulfate-hydrosulfite system are 0.01 wt.-% to 1.0 wt.-% for the oxidizing component and 0.015 to 1.5 wt.-% for the reducing component, based upon the total amount of all monomers.

Suitable emulsifiers (or so-called "surfactants") include, but are not limited to, the alkali metal alkyl aryl sulfonates, the alkali metal alkyl sulfates and the sulfonated alkyl esters. Specific examples of these well-known emulsifiers are sodium dodecylbenzene sulfonate, sodium disecondary-butylnaphthalene sulfonate, sodium lauryl sulfate, disodium dodecyldiphenyl ether disulfonate, disodium n-octadecylsulfosuccinate and sodium dioctylsulfosuccinate.

Suitable chain-transfer agents include, but are not limited to, carbon tetrachloride, bromoform, bromotrichloromethane, alkyl mercaptans, alkyl monothioglycolates, and thioesters such as n-dodecyl mercaptan, tertiary-dodecyl mercaptan, octyl mercaptan, tetradecyl mercaptan, hexadecyl mercaptan, butyl thioglycolate, isooctyl thioglycolate, and dodecyl thioglycolate. Preferred chain-transfer agents are the alkyl mercaptans and the alkyl monothioglycolates.

In the ensuing detailed description, certain terms and terminology will be utilized for purposes of conciseness, and for otherwise elucidating the features and advantages of my present invention. These terms are now defined hereinbelow.

The term "amino moiety" as used herein means that amino group, "basic" with respect to its pH contribution, which is structurally represented as $-NH_2$ or $-NHR_1$ or $-NR_1R_2$, where $R_1$ and $R_2$ are either linear or branched alkyl moieties. Such an amino group or "moiety" is, of course, clearly distinguishable from an "amide" group. An amide group is understood by those skilled in the art as being an organic compound which contains the structural group $-CONH_2$. (See, for example, page 41 of The Condensed Chemical Dictionary, Eighth Edition, published 1971 by Van Nostrand Reinhold.)

The term "crosslinker" as used herein is defined as any monomer containing at least two vinyl end groups. Accordingly, crosslinkers which are suitable for purposes of my present invention include, but are not limited to, divinylbenzene (DVB), ethyleneglycol diacrylate, ethyleneglycol dimethacrylate, trimethylolpropane triacrylate, trimethylolpropane trimethacrylate, pentaerythritol triacrylate, pentaerythritol trimethacrylate, allyl methacrylate, allyl acrylate, allyl maleate, diallyl maleate, polyethylene glycol diacrylate, and polyethyleneglycol dimethacrylate. Additional crosslinkers, well known to those skilled in the art and suitable for purposes of my present invention, are disclosed in U.S. Pat. No. 3,915,921 to Schlatzer, Jr.; in U.S. Pat. No. 4,190,562 to Westerman; and in U.S. Pat. No. 4,554,018 to Allen.

The term "emulsion" as used herein is understood to mean a "stable" mixture or two or more mutually immiscible substances held in suspension by relatively small percentages of substances or compounds called "emulsifiers" (or "surfactants"). The terms "latex" and "latices", moreover, are technically understood by those skilled in the art as being references to particular "types" of emulsions. Emulsions generally consist of a continuous phase and a discontinuous phase dispersed throughout the continuous phase. Occasionally, the entire discontinuous phase itself and/or certain components thereof (such as emulsion polymerization-produced polymeric particles contained therein) are referred to as a "dispersion" with respect to the continuous phase. Thus, in a number of polymeric emulsions, the discontinuous phase can include emulsion polymerization-produced polymeric particles which are insoluble in the continuous phase. Such polymeric particles might, however, be relatively soluble in the discontinuous phase. (See, e.g., page 346 of The Condensed Chemical Dictionary, Eighth Edition, published 1971 by Van Nostrand Reinhold; see also pages 900–930 of the Kirk-Othmer "Encyclopedia of Chemical Technology", Third Edition, Volume 8, published 1979 by John Wiley & Sons, Inc.)

As was mentioned above, the first-step (or first-stage portion) of my novel method for producing the acidic, concentrated, polymeric emulsion comprises emulsion polymerizing, in acidic aqueous media, an acidic moiety-containing emulsion-polymerizable monomer and an ethylenically-unsaturated emulsion-polymerizable monomer that is copolymerizable with the acidic moiety-containing emulsion-polymerizable monomer, at predetermined emulsion-polymerization reaction conditions, for producing an alkali-soluble dispersion in the aqueous media.

Preferably, the acidic moiety-containing monomer is selected from the group consisting of acrylic acid, methacrylic acid, an acidic phosphate moiety-containing emulsion-polymerizable monomer, a sulphonic acid moiety-containing emulsion-polymerizable monomer, and mixtures thereof. Methacyloylethyl phosphate ester and methacyloylpropyl phosphate ester are illustrative of two such phosphate moiety-containing emulsion-polymerizable monomers that are suitable. Styrenyl sulphonic acid is illustrative of a sulphonic acid moiety-containing emulsion-polymerizable monomer that is suitable.

As was also mentioned above, the ethylenically-unsaturated emulsion-polymerizable monomer is selected from the group consisting of a mono vinylidene aromatic monomer, an alpha beta ethylenically-unsaturated carboxylic acid ester and its derivatives, a vinyl ester and its derivatives, an ethylenically-unsaturated dicarboxylic anhydride and its derivatives, and mixtures thereof.

Accordingly, preferred mono vinylidene aromatic monomers include styrene, alpha-methyl styrene, and mixtures thereof.

Preferred alpha beta ethylenically-unsaturated carboxylic acid esters and derivatives thereof include methyl acrylate, ethyl acrylate, butyl acrylate, methyl methacrylate, and mixtures thereof.

Vinyl acrylate is an example of one preferred vinyl ester which would be suitable for purposes of my invention.

The second-step (or second-stage portion) of my novel method for producing the acidic, concentrated, polymeric emulsion comprises (1) adding to the alkali-soluble dispersion-containing aqueous media a second monomer mixture comprising the above-mentioned ethylenically-unsaturated monomer and an effective amount of an amino moiety-containing emulsion-polymerizable monomer that is copolymerizable with the ethylenically-unsaturated monomer and (2) emulsion-polymerizing the second monomer mixture in the presence of the alkali-soluble dispersion, while maintaining acidic conditions of the aqueous media, for producing the acidic, concentrated, polymeric emulsion.

Suitable amino moiety-containing monomers include, but are not limited to, vinyl pyridine and its derivatives as well as monoalkyl-substituted and dialkyl-substituted amino moiety-containing compounds such as aminoalkyl acrylates, aminoalkyl methylacrylates, aminoalkyl acrylamides and aminoalkyl methacrylamides, and their quaternary ammonium derivatives.

Preferred amino moiety-containing monomers are selected from the group consisting of dimethyl aminoethyl methacrylate, diethyl aminoethyl methacrylate, vinyl pyridine and its derivatives, and combinations thereof.

As was mentioned above, one aspect of my present invention is directed to a novel method of producing a concentrated, polymeric emulsion. Such a concentrated emulsion, initially acidic, can be diluted and thereafter neutralized to provide a novel polymeric thickener.

The concentrated polymeric emulsion, in its acidic aqueous media (occasionally hereinafter referred to as "in its acid form"), is characterized as a relatively high-solids content, relatively low-viscosity polymeric dispersion. I prefer to produce the polymeric emulsion at a concentration of about 30 wt.-% solids, based on total weight of the thus-produced concentrated, polymeric emulsion.

The production of such a concentrated polymeric emulsion is, to those skilled in the art, relatively straightforward and can be effected in many industrial, presently-existing, commercial-sized emulsion-polymerization production facilities.

Further, production of such a polymeric emulsion in its acidic, "concentrated" form minimizes a variety of so-called "capital" expenses such as facilities for storage, and also tends to minimize a variety of so-called "non-capital" expenses such as maintenance of the product-storage facilities and the handling and transportation expenses associated therewith (to, e.g., ultimate users) as well as attendant manpower costs.

When the concentrated, polymeric thickener is added as a liquid colloidal dispersion to a particular formulation, the finely-divided polymer particles of the polymeric thickener dissolve almost instantly upon pH adjustment. The ease of handling, the ease of metering, and the ease of dispersing the liquid emulsion polymer, as well as the rapid solubilization by controlled pH adjustment and the highly desirable attendant rheological properties make this liquid emulsion polymer a most effective and efficient thickening agent for a wide variety of applications including latex paints and other aqueous coating compositions.

In connection with the production of a particular thickener-containing formulation such as a liquid soap, an auto paste wax or polish formulation, or a latex paint, the polymeric thickener disclosed herein may be present in about 1 to about 5 wt.-%, based on total weight of the formulation.

My novel polymeric thickener, thus diluted but still in the acid form, has a viscosity of about 1 centipoise (i.e., about the viscosity of water).

However, as is shown in the accompanying FIGURE, the viscosity of the thus-diluted polymeric emulsion increases markedly above about 6.5 pH. Indeed, addition of alkali to the thus-diluted polymeric emulsion, produced in accordance with the principles of my novel method, has been observed to dissolve at least a portion of the thus-produced emulsion-polymer particles dispersed throughout the aqueous media, which results in the observed marked increase in viscosity. The emulsion-polymer particles produced in accordance with the method of my present invention are thus characterized as being "alkali-soluble".

Thus another aspect of my present invention comprises the additional steps of (1) diluting the acidic concentrated polymeric emulsion and (2) adding an effective amount of alkali to the thus-diluted emulsion for dissolving at least a portion of the emulsion-polymer particles dispersed throughout the polymeric emulsion, for thereby increasing the thus-diluted polymeric emulsion viscosity. This, in turn, increases the viscosity of the formulation containing the polymeric emulsion.

Suitable alkali ingredients include, but are not limited to, sodium, potassium, lithium and ammonium hydroxide and the carbonates and bicarbonates thereof, and mixtures of the same, and also amine bases having not more than one primary or secondary amino group. Such amines include, for example, triethanol amine, ethanol amine, isopropanol amine, triethyl amine, and trimethyl amine.

While not wanting to be bound by theoretical considerations yet desirous of providing a complete disclosure, it is presently theorized that the chemical mechanisms which give rise to the observed increase in viscosity, after dilution and neutralization of the above-described concentrated polymeric emulsion, take place as follows.

In the first-step (or first-stage portion) of my novel method for preparing such a concentrated polymeric emulsion, namely that step wherein the acidic moiety-containing emulsion-polymerizable monomer is reacted with the ethylenically-unsaturated emulsion-polymerizable monomer, it is presently postulated that such a reaction gives rise to production of so-called "polymeric strands". In the second-stage portion of my novel method it is further postulated that copolymeric reaction of the amino moiety-containing emulsion-polymerizable monomer with the ethylenically-unsaturated monomer gives rise to certain "polymeric particles" which, it is believed, become interspersed throughout the strands. It is still further postulated that such "particles" carry an electric charge of particular value, and that an opposite or so-called "balancing" electric charge of like value (but opposite in sign) is distributed along the length of the "strands". It is currently further believed that the "strands" are water-soluble and/or alkali-soluble (hereinafter simply referred to as "insoluble" in acidic media). Furthermore, it is also currently believed that the "particles" are insoluble in aqueous "basic" media. It is yet further believed that the thus-insoluble "particles" form a crosslinked network along with the "strands" through a so-called "ionic interation" mechanism which is believed to take place as a result of the electrical charge of the insoluble "particles" and the opposite electrical charge of the "strands".

DETAILED DESCRIPTION OF EXAMPLES

The following examples are set forth to describe more particularly, to those skilled in the art, the various principles, features and advantages of my present invention. As such, they are not intended to limit my invention but rather are merely illustrative of certain advantages of utilizing the novel thickener of my present invention.

EXAMPLE 1

"Control"

As a "control", the alkali-soluble dispersion of Example 1 was prepared as follows. 270 grams of de-ionized water along with 1.5 grams of sodium lauryl sulfate (NaLS), which is a commercially-available emulsifier, were charged into a 1-liter, round-bottomed flask and were heated to a temperature of 80° C. under a slow stream of inert atmosphere (i.e., nitrogen gas) to provide an aqueous, emulsifier-containing solution. To such a solution was added a portion, namely 9 milliliters, of a polymeric mixture referred to as mixture "C". Mixture "C" consisted of 81 grams of methacrylic acid (MAA), 99 grams of butyl acrylate (BA), 0.6 grams of divinyl benzene (DVB), and 4.5 grams of "TRITON X-100" (brand) emulsifier. After addition of the 9 milliliter portion of mixture "C" to the flask, the flask contents were subsequently held at the 80° C. reaction temperature for 2 minutes. Next, a portion, namely 20 milliliters of a second mixture, referred to as mixture "B", were added to the flask. Mixture "B" consisted of 100 grams of de-ionized water, 0.9 grams of ammonium persulfate (an initiator), and 1.5 grams of sodium lauryl sulfate (NaLS). After addition of the 20 milliliter portion of mixture "B" to the flask, the flask contents were subsequently held at the 80° C. reaction temperature for an additional 5 minutes. Thereafter, the remainder portions of mixtures "B" and "C" were simultaneously added to the flask over a time period of about 80–90 minutes to produce an alkali-soluble dispersion. The alkali-soluble dispersion, produced thusly, had a pH of about 2.0 and a concentration of about 30 wt.-% solids, based on total weight. After thus being produced, the alkali-soluble dispersion was diluted with de-ionized water to 2 wt.-% solids, on a total weight basis; and the pH-responsive quality of the 2 wt.-% dispersion was determined, as can be viewed in the accompanying FIGURE. For example, the viscosity of the now-diluted, 2 wt.-% solids alkali-soluble dispersion of Example 1, was 200 centipoise at pH 9, as is shown in the accompanying FIGURE. The alkali-soluble dispersion of Example 1, designated above as a "control", was prepared for purposes of comparing certain properties of the Example 1 dispersion to those polymeric emulsions discussed below in connection with Examples 2–4. Examples 2–4, which illustrate certain features and advantages of my present invention, will now be discussed.

EXAMPLE 2

One pH-Responsive Polymeric Emulsion

Described above in connection with Example 1 is a one-step method for producing an alkali-soluble dispersion in aqueous media. In particular, Example 1, which itself is not part of my present invention, discloses a one-step method for producing a particular, alkali-soluble dispersion. Such a method comprises the step of emulsion-polymerizing, in acidic aqueous media, a first monomer mixture which comprises an acidic moiety-containing emulsion-polymerizable monomer and a specified ethylenically-unsaturated emulsion-polymerizable monomer that is copolymerizable with the acidic moiety-containing emulsion-polymerizable monomer, at specified emulsion-polymerization reaction conditions, which results in the production of an alkali-soluble dispersion in the aqueous media.

In connection with the preparation of the concentrated polymeric emulsion of Example 2, the above procedures of Example 1 were repeated to produce a similar alkali-soluble dispersion for Example 2. Unlike Example 1, however, and following the completion of the 80-90 minute period-of-time needed for addition of the remainder portions of mixtures "B" and "C", the thus-produced alkali-soluble dispersion was held at the reaction temperature of 80° C. for an additional 15 minutes. Subsequently, yet another mixture, referred to as mixture "D" and which consisted of 50 grams of de-ionized water and 1.5 grams of ammonium hydroxide ($NH_4OH$), an alkali neutralizing ingredient, were added to the alkali-soluble dispersion over a time period of 5 minutes. Next, still another mixture, referred to as mixture "E" and which consisted of 54 grams of butyl acrylate (BA) and 6.4 grams of diethyl aminoethyl methacrylate (DEAEMA), were added to the alkali-soluble dispersion over a time period of about 20-25 minutes. The resultant mixture was subsequently held at the reaction temperature of 80° C. for an additional 40 minutes (i.e., following addition of all of the above-mentioned monomer of mixture "E"); and thereafter, the flask contents were cooled to room temperature (i.e., about 25° C.) and filtered through cheesecloth. The filtered, concentrated polymeric emulsion thus produced was about 30 wt.-% solids, on a total weight basis. The thus-produced, concentrated polymeric emulsion was then diluted to about 2 wt.-% solids with de-ionized water; and the viscosity of the 2 wt.-% solids polymeric emulsion of Example 2 was plotted at various pH values, as is shown in the accompanying FIGURE. At a pH of 9, for example, the viscosity of the thus-dilute polymeric emulsion of Example 2 is seen to be about 18,600 centipoise.

EXAMPLE 3

Another pH-Responsive Polymeric Emulsion

The procedures of Example 2 were repeated except that in the first-stage emulsion-polymerization portion of my novel method for the preparation of a concentrated polymeric emulsion, 49.5 grams of butyl acrylate (BA) and 49.5 grams of ethyl acrylate (EA) were substituted for the 99 grams of BA in the preparation of mixture "C". The pH-dependency of the polymeric emulsion of Example 3, similarly diluted to 2 wt.-% solids with de-ionized water, is also shown in the accompanying FIGURE.

EXAMPLE 4

Still Another pH-Responsive Polymeric Emulsion

The procedures of Example 2 were again repeated except that 49.5 grams of BA and 49.5 grams of vinyl acrylate (VAc) were substituted for the 99 grams of BA in the preparation of mixture "C". The pH-dependency of the polymeric emulsion of Example 4, also diluted to 2 wt.-% solids with de-ionized water, is similarly shown in the accompanying FIGURE.

EXAMPLE 5

Car Paste-Wax Formulation

A fluid is a substance which undergoes continuous deformation when subjected to a shear stress. The resistance offered by a real fluid to such deformation is called fluid viscosity. For gases and for simple liquids (e.g., relatively low molecular-weight liquids), the viscosity is constant if static pressure and temperature are fixed. Such materials are called Newtonian fluids. Fluid viscosity is often plotted in a graph where shear stress values are identified along a vertical axis and shear rate values are identified along a horizontal axis. In a Newtonian fluid, the shear-stress and shear-rate values, when determined and plotted, pass through the origin of such a graph. Bingham-plastic fluids, which are one type of non-Newtonian fluid, differ from Newtonian fluids only in that their linear relationship between shear stress and shear rate does not pass through the origin. In a Bingham-plastic fluid, a finite shear stress is required to initiate flow. (See, e.g., page 4 of Section 5 of "Perry's Chemical Engineers' Handbook", Sixth edition, published 1984 by McGraw-Hill Book Company.) For a Bingham-plastic fluid, such a finite shear stress is referred to as the fluid "yield value" by those skilled in the art. It is generally desirable that the rheological properties of a car paste-wax formulation be that of a Bingham-plastic fluid.

In a car paste-wax formulation, the peaks and valleys appearing in the paste-wax upper surface are evidence of a Bingham-plastic fluid. If the peaks and valleys remain in the paste-wax upper surface over an extended period of time, tests indicate that a paste wax is generally able to function in its intended manner over such an extended period of time.

Accordingly, my associate and I prepared two car paste-wax formulations, one containing my novel polymeric thickener and the other containing a commercially-available thickener, the remainder of the two formulation ingredients, including the relative amounts of each such ingredient, being the same. In particular, the thickenable polymeric emulsion was produced in accordance with the procedures set forth in Example 2 above. The two paste-wax formulations were each split into two portions, to enable both formulations to be stored at ambient temperature (i.e., 68° to 77° F.) and at elevated temperature (100° F.). In connection with that paste-wax formulation which contained my novel polymeric thickener, the ambient temperature-stored and elevated temperature-stored portions, before and after being stored for a 12-month period, were each separately applied to car body surfaces.

After a period of twelve months, the ease-of-application onto and ease-of-removal from the car body were not noticeably different; nor were there any apparent differences in the high gloss and deep shine of the car body surface, between the beginning and end of the 12-month period of time, utilizing consistent application-and-removal techniques. Indeed, all formulations which included my novel thickener provided the car body with desirable gloss and shine.

The above-mentioned commercially-available thickener is known by some in the art by its brand name, namely "Acrysol ICS-1". (Its CTFA name is Acrylates/Steareth 20 Methacrylate Copolymer.) Acrysol ICS-1 (brand) thickener is presently available from Rohm & Haas, Co., Independence Mall West, Philadelphia, Pa. 19105.

Those paste-wax formulations containing the above-identified commercially-available thickener, stored at ambient and elevated temperature, were observed to possess undesirable shelf-life. In particular, prior to completion of the 12-month shelf-storage period, the viscosity of such formulations became so reduced in value that the formulations were not able to be used for their intended purpose. We observed, for example, that the upper surface of such paste-wax formulations quickly lost the hill-and-valley appearance over time and flattened. Also, the formulations quickly lost their paste-wax consistency over the time period and became more liquid-like (i.e., water-like) in consistency.

We thus observed that our car paste-wax formulation possessed a desirable shelf-life of up to twelve months at ambient and elevated (100° F.) temperatures; and we concluded that this desirable quality of our car paste-wax formulation was due to the presence of my novel polymeric thickener.

The composition of that paste-wax formulation which included my novel polymeric thickener is set forth in the following Table.

TABLE

Paste-Wax Formulation

| Ingredient | Function | Percent by Weight |
|---|---|---|
| Tap water | Carrier | 39.52 |
| Solvent 460 NPR | Carrier | 20.00 |
| Mineral Spirits #2 NPR | Carrier | 15.00 |
| Satintone #1 | Abrasive | 10.00 |
| Silicone 1000 cstk | Gloss | 6.00 |
| Filtered Carnauba | Gloss/Durability | 3.50 |
| Novel polymeric emulsion | Thickener/Stabilizer | 2.65 |
| Refined Paraffin 132/134 Mp | Gloss | 1.20 |
| POE (23) Lauryl Ether | Emulsifier | .60 |
| Ammonia, 28% | Alkali/Neutralizer | .38 |
| Formaldehyde | Preservative | .30 |
| Morpholine | Wetting Agent | .30 |
| Tan Micro Wax 165/170 Mp | Wipe-Off Agent | .30 |
| POE (4) Lauryl Ether | Emulsifier | .25 |

Solvent 460 NPR is an aliphatic hydrocarbon. It is characterized as "non photo-reducible" which means that it does not break down upon exposure to the atmosphere. Its function is that of a carrier for certain formulation ingredients such as the waxes and silicone. An additional function is to assist in the removal of certain oil-borne stains such as those caused by road tar. Solvent 460 NPR can be purchased from Shell Chemical Co. of Houston, Tex.

Mineral Spirits #2 NPR, also commercially available from Shell Chemical Co., is an additional carrier for the waxes and silicone ingredients. Both carriers, as well as their relative amounts, are chosen so as to provide the paste-wax formulation with a desired volatility.

Satintone #1 is a brand name for a commercially-available form of aluminum silicate. Satintone #1 is an abrasive ingredient; it provides the paste-wax formulation with the ability to mechanically clean a substrate surface via abrasion. Satintone #1 can be purchased from Engelhard Corp. of Edison, N.J.

Silicone 1000 (centistokes) provides the paste-wax formulation with desired gloss and ease-of-application qualities. The presence of this ingredient also enhances the wipe-off quality of the paste-wax formulation. Silicone 1000 cstk can be purchased from Dow-Corning Corp. of Midland, Mich., or from General Electric Co. of Pittsfield, Mass.

Filtered Carnauba, a filtered wax ingredient, provides the paste-wax formulation with desired gloss and durability qualities. Such wax is extracted from the carnauba plant, a Brazilian palm.

The presence of my novel polymeric emulsion is believed to not only thicken but also to stabilize the paste-wax formulation.

Refined Paraffin Wax 132/134 Mp, also commercially available from Shell Chemical Co., is a paraffin wax having a melt point temperature of about 132° to 134° F. Its function is to provide the paste-wax formulation with desired gloss, desired ease-of-application, and desired ease-of-removal (or wipe-off) qualities. The presence of this ingredient also tends to augment the durability aspect of the formulation.

POE (23) Lauryl Ether is a polyoxyethylene lauryl ether having 23 moles of ethoxylation; it functions as an emulsifier (or surfactant) for the paste-wax formulation. POE (23) Lauryl Ether is commercially available either from ICI Americas, Inc., of Wilmington, Del., or Mazer Chemicals, Inc., of Gurnee, Ill.

Ammonia (28%), a well-known alkali that is commercially available as a 28 wt.-% aqueous solution of ammonia ($NH_3$), is utilized to neutralize the pH of the paste-wax formulation.

Formaldehyde, utilized in the paste-wax formulation as a preservative, can be purchased from Borden Chemical of Columbus, Ohio, or from Hercules, Inc., of Wilmington, Del.

Morpholine, also known as tetrahydro-1,4-oxazine, is a wetting agent. The presence of this ingredient also provides the paste-wax formulation with additional alkalinity. Morpholine can be purchased from Texaco, Inc., of Houston, Tex., or from Union Carbide Corp. of New York, N.Y.

Tan Micro Wax 165/170 Mp is a micro-crystalline wax having a melt-point temperature of about 165° to 170° F. The presence of this ingredient provides the paste-wax formulation with a desired wipe-off quality. Tan Micro Wax 165/170 Mp can be purchased from Petrolite Corp. of Tulsa, Okla.

POE (4) Lauryl Ether is a polyoxyethylene lauryl ether having 4 moles of ethoxylation; it, like the POE (23) Lauryl Ether, also functions as an emulsifier (surfactant) for the paste-wax formulation. POE (4) Lauryl Ether, again like the POE (23) Lauryl Ether, is also commercially available either from ICI Americas, Inc., or Mazer Chemicals, Inc.

The above-listed paste-wax formulation was produced as follows. The silicone, mineral spirits, and solvent ingredients were combined to produce an organic phase. The organic phase was heated to 185° F. and the carnauba, paraffin, and micro wax ingredients were added, while maintaining this temperature and utilizing moderate agitation, until a solution was obtained. Separately, the water was heated to 185° F. and, thereafter, while utilizing vigorous agitation, the "Satintone", the POE (4) Lauryl Ether, the POE (23) Lauryl Ether and the Morpholine ingredients were separately slowly added (in the recited order) and, subsequently, the above-described solution was added, while maintaining agitation, to produce an aqueous emulsion. The thus-produced aqueous emulsion was agitated until uniform; then, utilizing reduced agitation, the formaldehyde, my novel polymeric emulsion, and the aqueous ammonia ingredients were slowly added to produce a thickener-containing paste-wax formulation. The thus-produced thickener-containing paste-wax formulation was then agitated until its consistency was uniform; and, thereafter, the now-uniform paste-wax formulation was transferred into a suitable container and air-cooled until its bulk temperature was reduced to about 100° F.

A novel method for producing an acidic, concentrated, polymeric emulsion that can be diluted and thereafter neutralized to provide a pH-responsive polymeric thickener has been described hereinabove. Also described hereinabove are a number of preferred methods for the production of such a concentrated, polymeric emulsion. While the novel polymeric emulsion, the various methods for making the same, and the use of such as a thickener, have been described hereinabove with reference to several preferred embodiments, my present invention is not to be limited to these embodiments. On the contrary, a variety of alternative methods of making the pH-responsive polymeric thickener of my present invention will become apparent to those skilled in the art upon reading the foregoing description. Accordingly, such alternatives, changes and/or modifications are to be considered as forming a part of my present invention insofar as they fall within the spirit and scope of the appended claims.

I claim:

1. A method for producing an acidic, concentrated, polymeric emulsion that can be diluted and thereafter neutralized to provide a polymeric thickener, the method comprising the steps of:

emulsion polymerizing, in acidic aqueous media, a first monomer mixture which, based upon total weight of the first monomer mixture, comprises 30-60 wt.-% of an acidic moiety-containing emulsion-polymerizable monomer and an ethylenically-unsaturated emulsion-polymerizable monomer copolymerizable with the acidic moiety-containing monomer and selected from the group consisting of a mono vinylidene aromatic monomer, an alpha beta ethylenically-unsaturated carboxylic acid ester and its derivatives, a vinyl ester and its derivatives, an ethylenically-unsaturated dicarboxylic anhydride and its derivatives, and mixtures thereof, at predetermined reaction conditions, for producing an alkali-soluble dispersion in said acidic aqueous media;

adding to the alkali-soluble dispersion-containing acidic aqueous media a second monomer mixture which comprises said ethylenically-unsaturated monomer and an amino moiety-containing emulsion-polymerizable monomer that is copolymerizable with said ethylenically-unsaturated monomer;

emulsion-polymerizing the aqueous media-contained second monomer mixture in the presence of the alkali-soluble dispersion, while maintaining acidic conditions of the aqueous media, for producing the concentrated polymeric emulsion;

diluting the concentrated polymeric emulsion; and adding an effective amount of an alkali to the thus-diluted polymeric emulsion for dissolving at least a portion of the emulsion-polymer particles, for thereby increasing the polymeric emulsion viscosity.

* * * * *